(12) United States Patent
Morales

(10) Patent No.: US 7,874,080 B1
(45) Date of Patent: Jan. 25, 2011

(54) MEASURING DEVICE AND METHOD FOR MEASURING SUSPENSION SAG OF A VEHICLE

(76) Inventor: Robert Morales, 16421 Gothard St., Suite A, Huntington Beach, CA (US) 92647

(*) Notice: Subject to any disclaimer, the term of this patent is extended or adjusted under 35 U.S.C. 154(b) by 166 days.

(21) Appl. No.: 12/369,541

(22) Filed: Feb. 11, 2009

(51) Int. Cl.
*G01B 5/14* (2006.01)
*G01B 3/20* (2006.01)

(52) U.S. Cl. .......................................... 33/600; 33/809

(58) Field of Classification Search ................... 33/203, 33/203.18, 203.19, 203.2, 288, 336, 337, 33/600, 608, 612, 787, 790, 809
See application file for complete search history.

(56) References Cited

U.S. PATENT DOCUMENTS

| 285,661 | A | * | 9/1883 | Paine | 33/790 |
| 909,068 | A | * | 1/1909 | Denman et al. | 33/809 |
| 4,202,108 | A | * | 5/1980 | Adams et al. | 33/379 |
| 4,407,073 | A | * | 10/1983 | Nilsson et al. | 33/203.18 |
| 4,416,064 | A | * | 11/1983 | Hurst | 33/612 |
| 5,027,524 | A | | 7/1991 | Metcalf et al. | 33/600 |
| 5,369,602 | A | * | 11/1994 | Naas et al. | 702/166 |
| 5,398,419 | A | | 3/1995 | Schmidt | 33/203 |
| 6,240,648 | B1 | * | 6/2001 | Dolph | 33/203.18 |

FOREIGN PATENT DOCUMENTS

| JP | 10073402 A | * | 3/1998 |
| WO | WO 9923448 A1 | * | 5/1999 |

* cited by examiner

*Primary Examiner*—R. A. Smith
(74) *Attorney, Agent, or Firm*—Eric Karich

(57) ABSTRACT

A measuring device has a first elongate body element, a second elongate body element, and an elongate ruler element. The first and second elongate body elements slidably engage each other, and the elongate ruler element is slidably engaged adjacent the first elongate body element. A plurality of ruler markings on the elongate ruler element enable measuring the sag of a vehicle. A partial-fastening element fastens the elongate ruler element to the first elongate body element. A body fastening clip is attached to a top end of the first elongate body element for removably engaging a body of the vehicle. A hub engagement post is attached to the second elongate body element for removably engaging a hub of the vehicle. A method of using the measuring device to measure the sag of the vehicle is also disclosed.

8 Claims, 5 Drawing Sheets

MEASURING DEVICE AND METHOD FOR MEASURING SUSPENSION SAG OF A VEHICLE

CROSS-REFERENCE TO RELATED APPLICATIONS

Not Applicable

STATEMENT REGARDING FEDERALLY SPONSORED RESEARCH

Not Applicable

BACKGROUND OF THE INVENTION

1. Field of the Invention

This invention relates generally to measuring devices, and more particularly to a measuring device for measuring suspension sag of a vehicle.

2. Description of Related Art

The prior art teaches various devices for measuring the "sag" of a vehicle (i.e., the amount that the vehicle's suspension sinks under the weight of the vehicle and/or the rider). The "rider sag," the amount that the motorcycle sinks under the weight of the rider, is particularly important to the performance of the vehicle, particularly a motorcycle. Adjusting the spring tension of the motorcycle to adjust the sag has an important impact on the performance of the motorcycle. The rider sag may need to be adjusted for different riders who are of different weights and/or have different riding techniques or preferences, and may even be adjusted by a single rider to adjust the motorcycle for a particular race, so that the motorcycle provides the most desirable handling characteristics for that race.

Most prior art measuring devices rely primarily on more or less directly measuring, with a ruler, tape measure, or similar device, the distance from a hub of a wheel to a reference point on a body of the vehicle. An example of such a method is shown in Schmidt, Jr. et al., U.S. Pat. No. 5,398,419. Disadvantages of this techniques include: 1) that it requires two people to perform the measurement; 2) that it requires recording and calculating the measurement; and 3) inconsistent measurements will occur because the user has to locate the measure points every time a measurement is made.

The state of the art device for use with motorcycles is Metcalf et al., U.S. Pat. No. 5,027,524, which teaches a suspension gauge that includes two telescoping element, and a ring that slides over one of the elements. Measurement markings are printed on one of the telescoping elements for measuring the movement of the ring, thereby enabling calculation of the sag. The initial position of the ring is first noted against the scale, and then the weight is applied to the vehicle (vehicle and/or rider), and the movement of the ring can be observed and measured relative to the starting position. Metcalf is somewhat difficult to use, however, and errors in calculations can lead to incorrect measurements of the vehicle's sag. The above-described references are hereby incorporated by reference in full.

The prior art teaches a suspension gauge that includes two telescoping elements that slide a measurement ring relative to markings on one of the telescoping elements. However, the prior art does not teach an even easier system that includes two telescoping elements that move a third ruler element, wherein the measurement markings are located on the third ruler element rather than one of the telescoping elements. The use of the ruler element makes the task of measuring sag extremely simple, with no need for any calculations whatsoever. Furthermore, the necessary measurement may be easily made by a single person, and without any room for error. The present invention fulfills these needs and provides further related advantages as described in the following summary.

SUMMARY OF THE INVENTION

The present invention teaches certain benefits in construction and use which give rise to the objectives described below.

The present invention provides a measuring device for measuring suspension sag of a vehicle. The measuring device comprises a first elongate body element and a second elongate body element slidably engaged with the first elongate body element so that the first and second elongate body elements slide with respect to each other between an extended configuration and a retracted configuration. An elongate ruler element has a proximate end and a distal end. The elongate ruler element is slidably engaged adjacent the first elongate body element. A plurality of ruler markings are on the elongate ruler element for measuring distance from the proximate end of the elongate ruler element. A partial-fastening element fastens the proximate end of the elongate ruler element to the first elongate body element such that the elongate ruler element is partially fastened to the first elongate body element and tends to move with the first elongate body element, but can move independently from the first elongate body element when the second elongate body element presses against the partial-fastening element with sufficient force. A body fastening clip is attached to a top end of the first elongate body element. The body fastening clip is adapted to removably engage a body of the vehicle. A hub engagement post is attached to a lower end of the second elongate body element, the hub engagement post being adapted to removably engage a hub of the vehicle. A method of using the measuring device to measure the sag of the vehicle is also disclosed.

A primary objective of the present invention is to provide a measuring device and method having advantages not taught by the prior art.

Another objective is to provide a measuring device that may be used by a single person to measure the suspension sag of a vehicle.

A further objective is to provide a measuring device and method that is easy to use, is accurate, and does not require any calculations on the part of the user.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, a measuring device 10 for measuring suspension sag of a vehicle 12.

Figure 1:
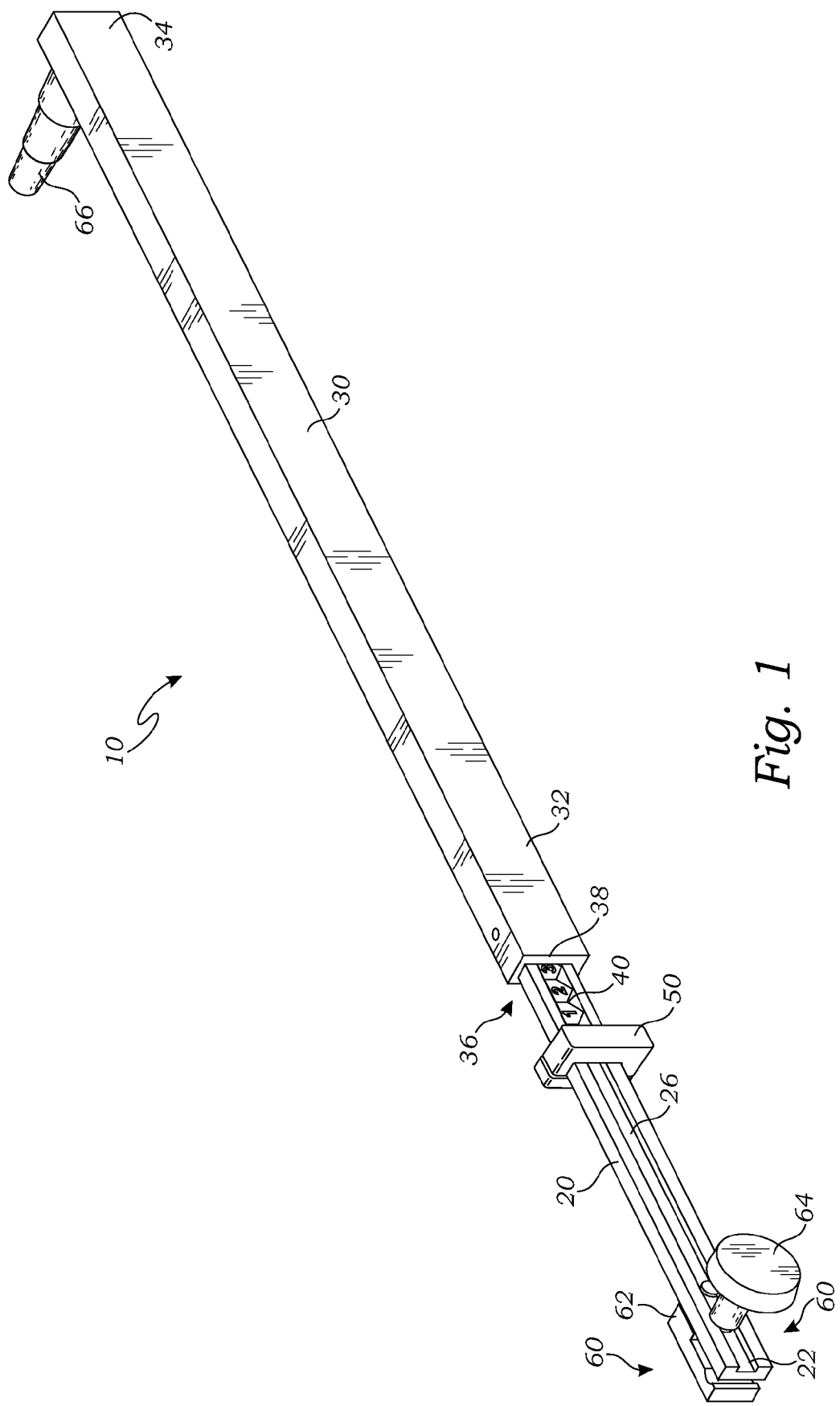
FIG. 1 is a perspective view of a measuring device according to one embodiment of the present invention, illustrating a first elongate body element, a second elongate body element, and an elongate ruler element.
Figure 2:
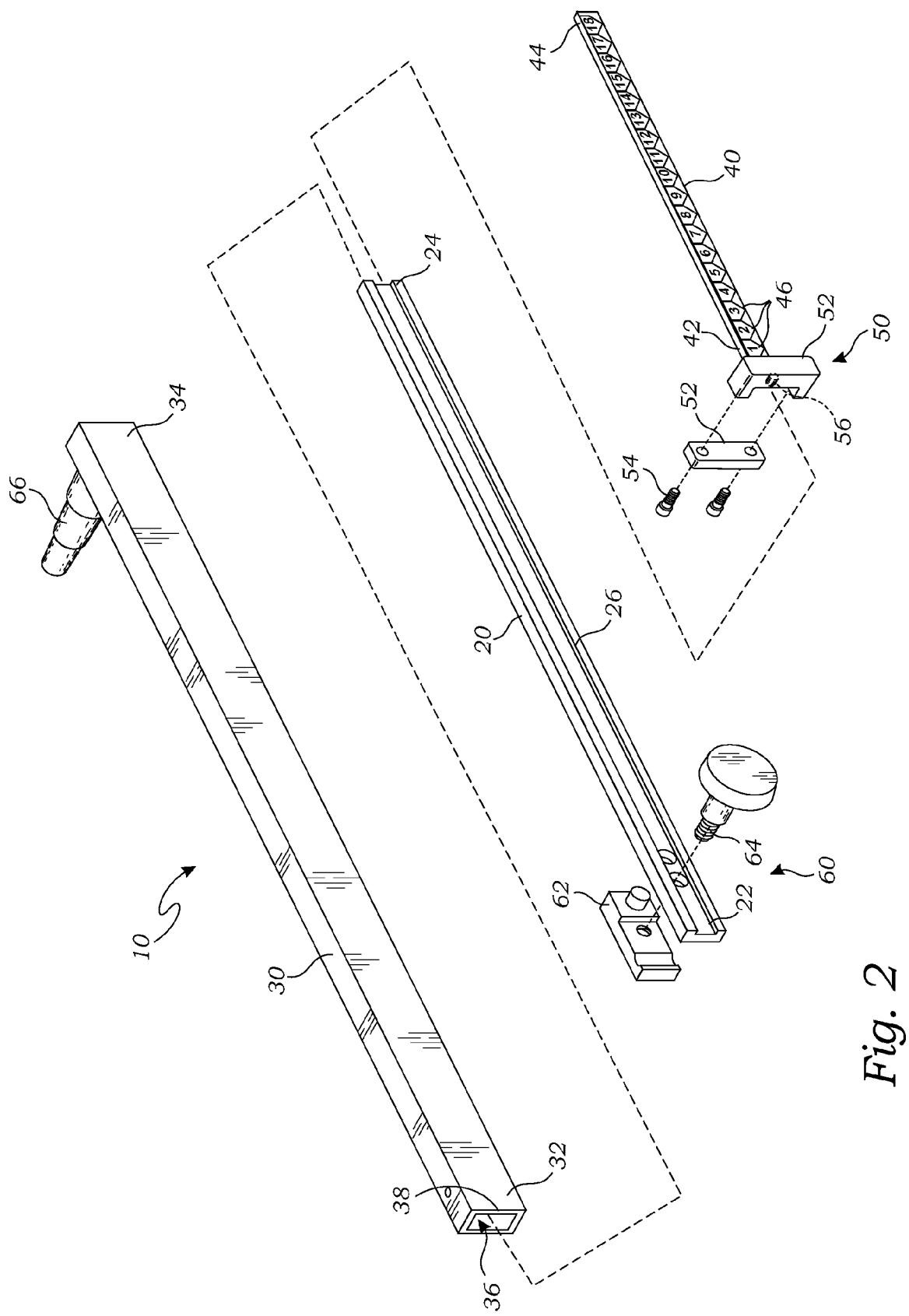
FIG. 2 is an exploded perspective view thereof.

FIG. 1 is a perspective view of one embodiment of the measuring device 10. FIG. 2 is an exploded perspective view of the measuring device 10. As shown in FIGS. 1 and 2, the measuring device 10 includes a first elongate body element 20 having a top end 22 and a bottom end 24. In one embodiment, the first elongate body element 20 is a rod. In the embodiment of FIGS. 1 and 2, the rod has a generally U-shaped cross section that defines a channel 26. The first elongate body element 20 may be constructed of any suitable material such as metal or plastic, however, any material having a suitably rigid or semi-rigid quality may be used and should be considered within the scope of the invention.

The measuring device 10 also includes a second elongate body element 30 that slidably engages the first elongate body element 20. The second elongate body element 30 may be a tubular construction having an upper end 32 and a lower end 34 with an interior 36 allowing the second elongate body element 30 to be telescopically engaged with the first elongate body element 20 so that the first and second elongate body elements 20 and 30 slide with respect to each other between an extended configuration and a retracted configuration.

The measuring device 10 further includes an elongate ruler element 40 having a proximate end 42 and a distal end 44. The elongate ruler element 40 is slidably engaged adjacent the first elongate body element 20. The elongate ruler element 40 may be, for example, a rigid strip, rod, or similar structure shaped to be slidably engaged within the channel 26 of the first elongate body element 20. In the embodiment of FIGS. 1 and 2, the first elongate body element 20 and the elongate ruler element 40 together fit telescopically into the interior 36 of the second elongate body element 30.

A plurality of ruler markings 46 are formed on the elongate ruler element 40 for measuring distance, such as from the proximate end 42 of the elongate ruler element 40. In one embodiment, the plurality of ruler markings 46 measure distance from a partial-fastening element 50, described below. The plurality of ruler markings 46 may be formed in any way known in the art (e.g., etched, printed, molded, marked, etc.).

The elongate ruler element 40 is attached to a partial-fastening element 50, which partially fastens the proximate end 42 of the elongate ruler element 40 to the first elongate body element 20. The partial-fastening element 50 allows the elongate ruler element 40 to move with the first elongate body element 20, or move independently of the first elongate body element 20 when the second elongate body element 30 presses against the partial-fastening element 50 with sufficient force.

The partial-fastening element 50 may be any form of connector or engagement element that provides the necessary connection so that the elongate ruler element 40 moves as described.

In the embodiment of FIGS. 1 and 2, the partial-fastening element 50 includes a pair of clamp elements 52, such as brackets, fastened together with screws 54 to fit around both the first elongate body element 20 and the elongate ruler element 40. One of the pair of clamp elements 52 may be fixedly attached to the proximate end 42 of the elongate ruler element 40 with a suitable fastening mechanism 56, such as a fastening element (e.g., a screw), an adhesive, or other element.

The measuring device 10 includes a body fastening clip 60 which may be attached to a top end 22 of the first elongate body element 20. For purposes of this application, the term "body fastening clip" is hereby defined to include any structure or method of fastening the top end 22 to the body 14 consistent with the method described herein. The body fastening clip 60 may be any element that may fasten the measuring device 10 to the body 14 of the vehicle 12. The measuring device 10 may typically be attached to a fender of the vehicle 12; however, alternative attachment points may also be used, as long as they are functional for taking the measurements described herein.

In the embodiment of FIGS. 1 and 2, the body fastening clip 60 is a clamping arm 62 that functions to clamp the fender against the first elongate body element 20 upon the tightening of a locking screw 64 that extends through both the first elongate body element 20 and the clamping arm 62. While one embodiment of the body fastening clip 60 is illustrated herein, those skilled in the art may devise many alternative fasteners, and such alternatives should be considered within the scope of the invention.

The measuring device 10 also includes a hub engagement post 66 attached to the lower end 34 of the second elongate body element 30. For purposes of this application, the term "hub engagement post" is hereby defined to include any structure or method of engaging, clipping, or otherwise fastening the lower end 34 to the hub 18 or wheel 16 consistent with the method described herein. The hub engagement post 66 may be constructed in many ways, so long as the element functions to engage the hub 18 (or other part of the wheel 16) as described herein. In the embodiment of FIGS. 1 and 2, the hub engagement post 66 is a resilient post that is conical in shape and thereby able to engage hubs 18 of a variety of sizes and shapes. While one embodiment of the hub engagement post 66 is illustrated herein, those skilled in the art may devise many alternative structures that function as described, and such alternatives should be considered within the scope of the present invention.

Figure 3:
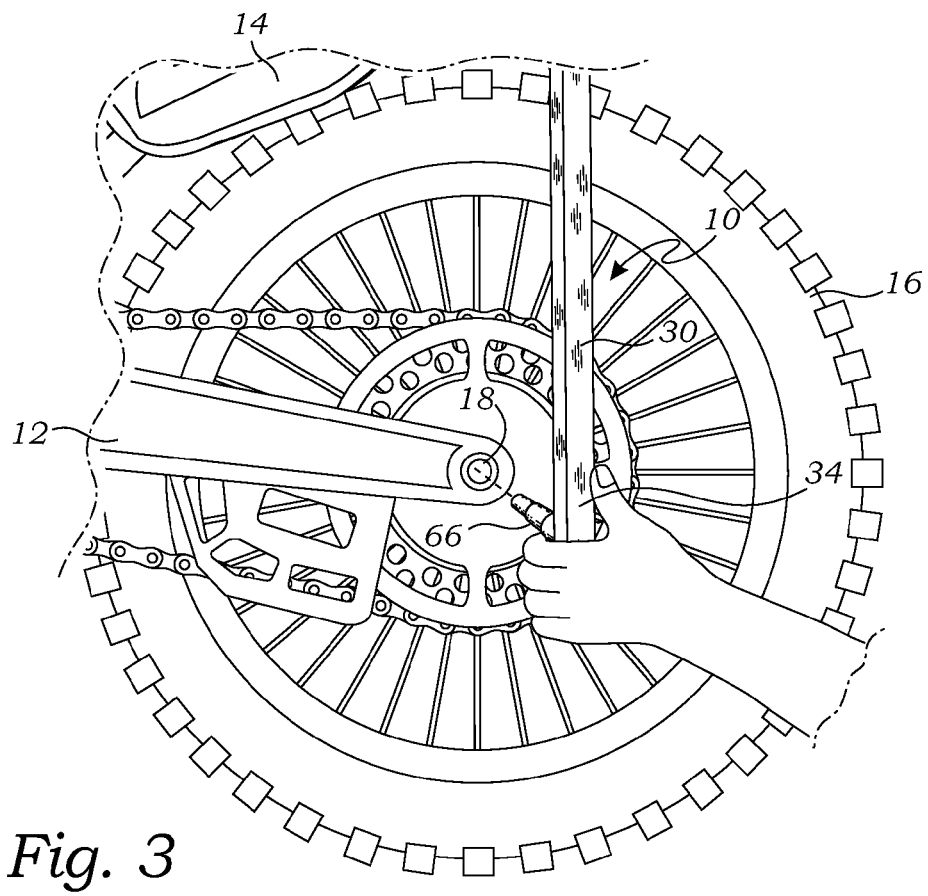
FIG. 3 is a perspective view of a hub of a wheel of a vehicle, illustrating a hub engagement post of the second elongate body element of the measuring device being inserted into the hub.
Figure 4:
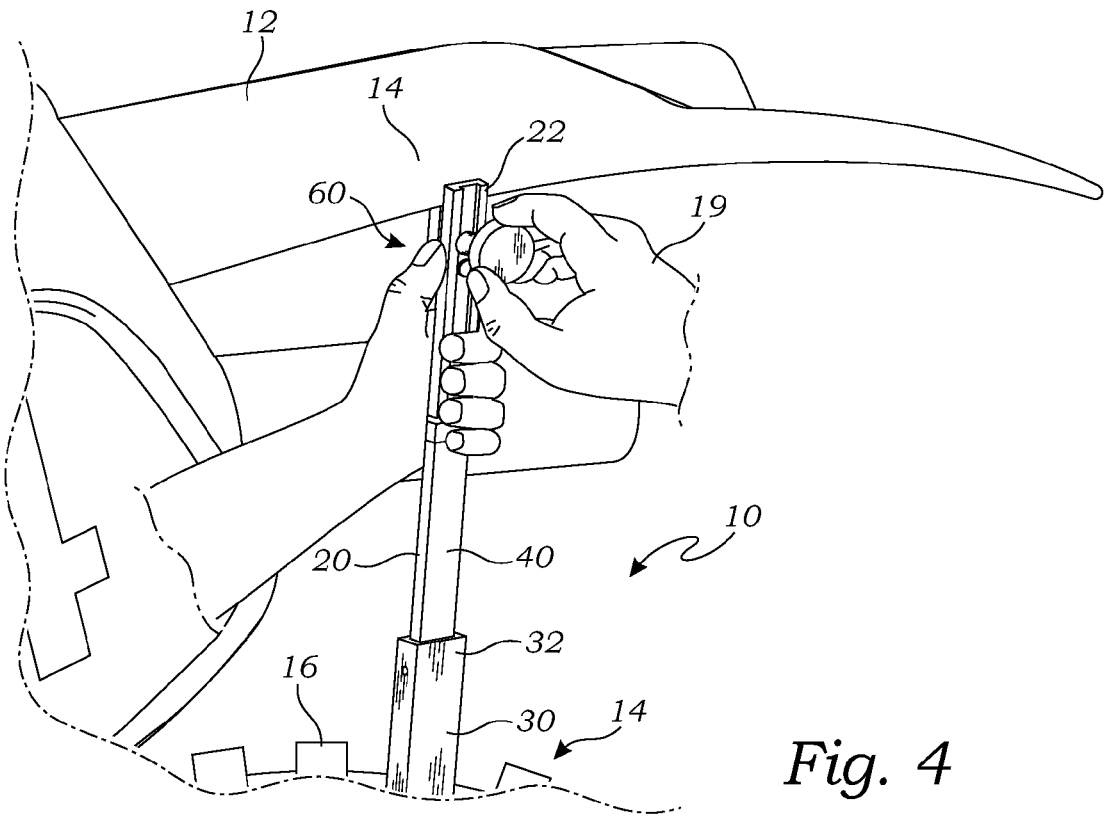
FIG. 4 is a perspective view of the vehicle, illustrating a body fastening clip of the first elongate body element of the measuring device being fastened to a body of the vehicle, such that the measuring device is connected between the body and the hub of the vehicle in an extended configuration.

As illustrated in FIGS. 3-7, the invention further includes a method of using the above-described measuring device 10 to measure the sag of a vehicle 12 having a body 14 and a wheel 16 having a hub 18. As illustrated in FIGS. 3 and 4, the first step is to fasten the top end 22 of the first elongate body element 20 to the body 14 of the vehicle 12, and to fasten the lower end 34 of the second elongate body element 30 to the hub 18 of the vehicle 12. In the embodiment of FIG. 3, the hub engagement post 66 of the second elongate body element 30 of the measuring device 10 is inserted into a hub 18 of the vehicle 12. The first and second elongate body elements 20 and 30 are then extended towards the extended configuration.

In the embodiment of FIG. 4, the body fastening clip 60 of the first elongate body element 20 of the measuring device 10 is fastened to the body 14 of the vehicle 12, such that the measuring device 10 is connected between the body 14 and the hub 18 of the vehicle 12 in an extended configuration In the embodiment of FIGS. 3 and 4, the vehicle 12 is a motorcycle, and the measuring device 10 is attached to the fender of the motorcycle. While the present embodiment illustrates one embodiment of the measuring device 10, the top end 22 of the first elongate body element 20 may be attached to the body 14 of the vehicle 12 at other locations and using alternative structures or means, and the lower end 34 of the second elongate body element 30 may likewise be secured to the hub 18 or other part of the wheel 16 using alternative structures or means, so long as the measuring device 10 is operatively secured therebetween for measuring the sag of the vehicle 12.

Figure 5:
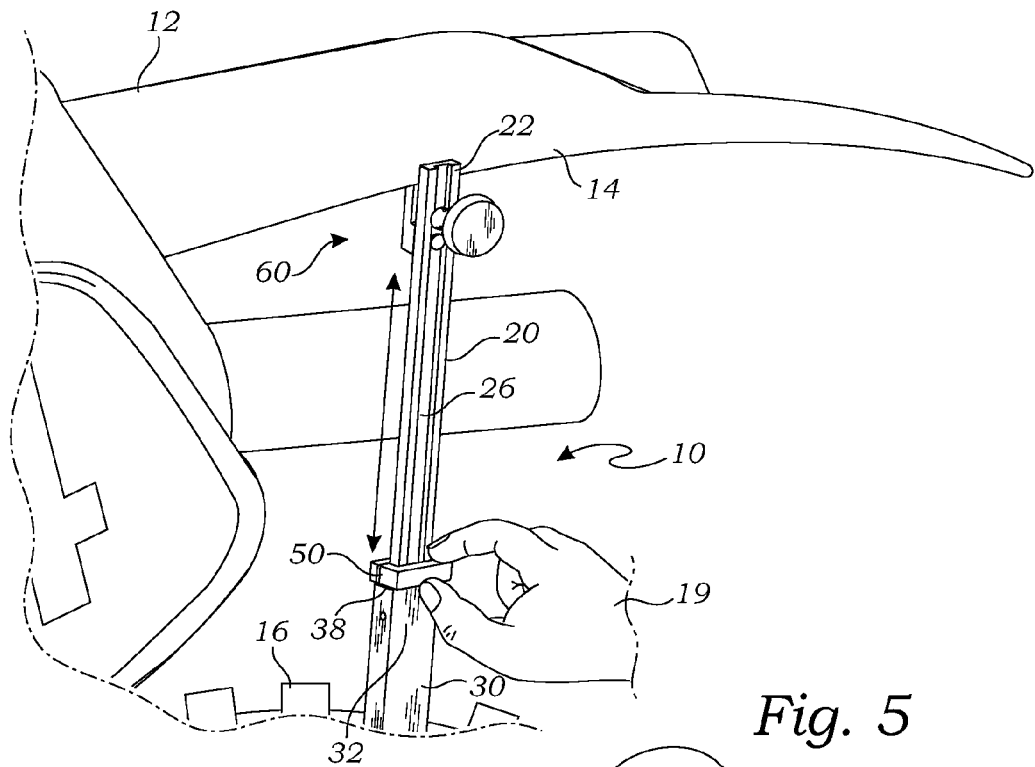
FIG. 5 is a perspective view of the measuring device, illustrating the rider pushing a partial-fastening element of the elongate ruler element downwards to abut an upper edge of the second elongate body element.

FIG. 5 is a perspective view of the measuring device 10 once it has been positioned between the body 14 and the wheel 16, as illustrated in FIGS. 3-4. FIG. 5 illustrates the rider 19 pushing the partial-fastening element 50 of the elongate ruler element 40 downwards to abut an upper edge 38 of the second elongate body element 30. For purposes of this application, the term "upper edge" is hereby defined to include alternative or equivalent structures that serve the purposes described herein.

Figure 6:
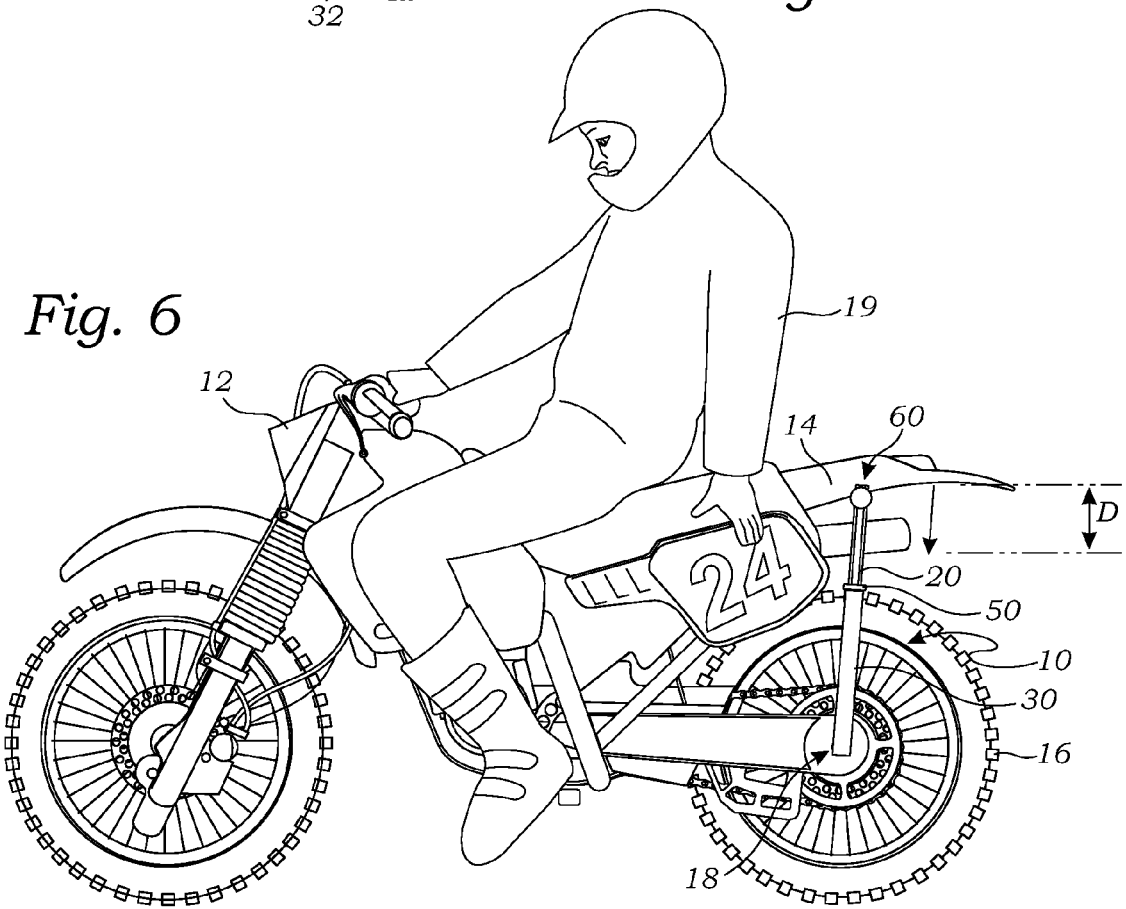
FIG. 6 is a perspective view of a rider astride the vehicle such that the weight of the rider lowers the body of the motorcycle relative to the hub, thereby compressing the first and second elongate body elements of the measuring device to a retracted position.

FIG. 6 is a perspective view of a rider 19 astride the vehicle 12 such that the weight of the rider 19 causes the body 14 to sag towards the hub 18, thereby compressing the first and second elongate body elements 20 and 30 of the measuring device 10 to a retracted position.

This also causes the upper edge 38 of the second elongate body element 30 to move the elongate ruler element 40 a distance D relative to the first elongate body element 20.

Figure 7:
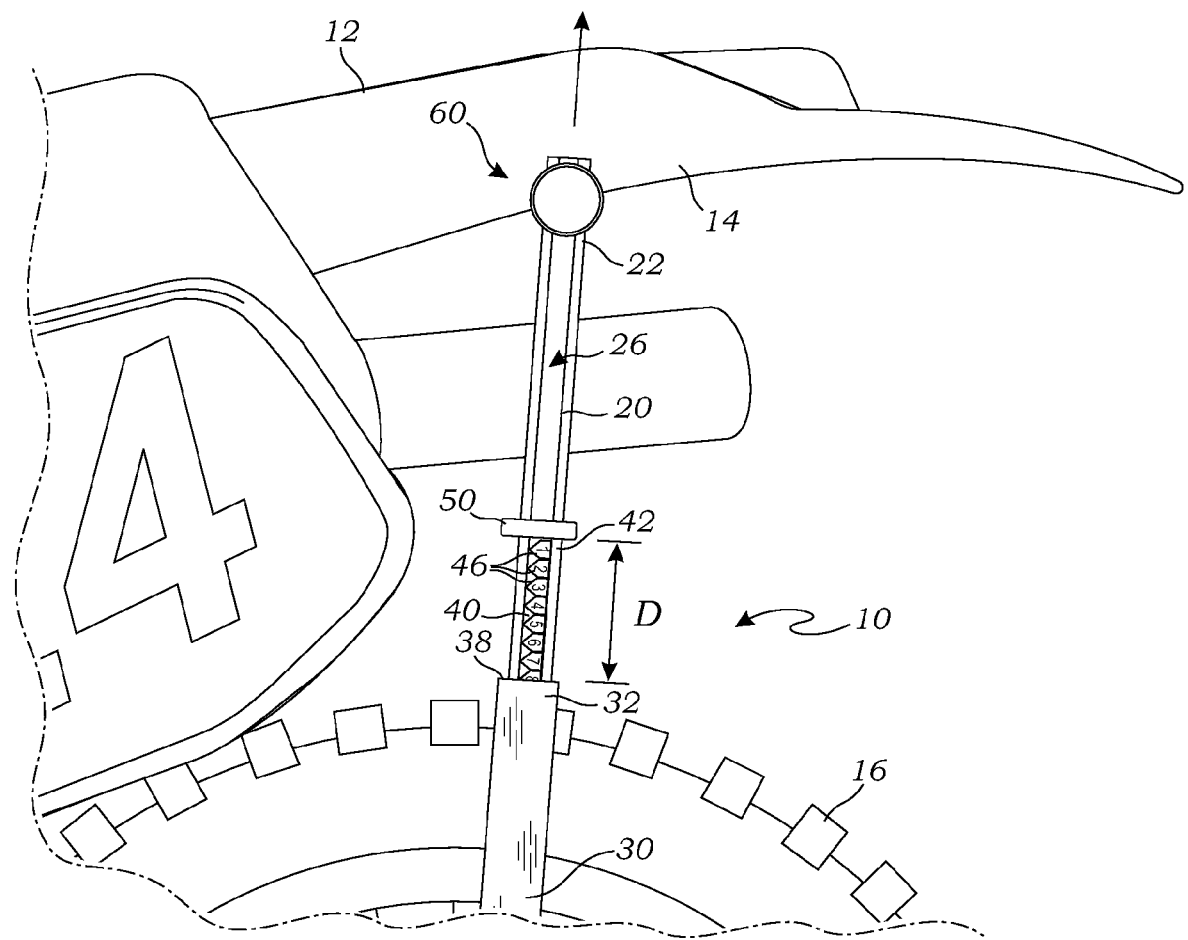
FIG. 7 is a perspective view of the vehicle once the rider has dismounted the vehicle, thereby causing the measuring device to return to the extended configuration, and causing the partial-fastening element to pull the elongate ruler element a distance from the upper edge of the second elongate body element, such that a plurality of ruler markings on the elongate ruler element indicate the measurement of the distance.

FIG. 7 is a perspective view of the vehicle 12 once the rider 19 has dismounted the vehicle 12. Once the rider 19 has been removed, the body 14 is able to lift back to its original position via the suspension of the vehicle 12. The vehicle 12 is also preferably lifted (e.g., onto a stand) so that the weight of the vehicle 12 is removed from the wheel 16. This causes the first and second elongate body elements 20 and 30 of the measuring device 10 to return back towards the extended configuration. This also causes the partial-fastening element 50 to pull the elongate ruler element 40 the distance D from the upper edge 38 of the second elongate body element 30, so that the plurality of ruler markings 46 on the elongate ruler element 40 indicate the measurement of the distance D.

The dismounted rider 19 can then easily read the distance D from the measuring device 10, without the assistance of a second rider, without requiring any calculations, and without any ambiguity or difficulty whatsoever.

As used in this application, the words "a," "an," and "one" are defined to include one or more unless specifically stated otherwise. The terms "have," "include," "contain," and similar terms are defined to mean "comprising" unless stated otherwise. Furthermore, the terminology used in the specification provided above is hereby defined to include similar and/or equivalent terms, and/or alternative embodiments that would be considered obvious to one skilled in the art given the teachings of the present patent application.

What is claimed is:

1. A measuring device for measuring suspension sag of a vehicle, the vehicle having a body and a wheel with a hub, the measuring device comprising:
   a first elongate body element having a top end and a bottom end;
   a second elongate body element having an upper end and a lower end, the second elongate body element being slidably engaged with the first elongate body element so that the first and second elongate body elements slide with respect to each other between an extended configuration and a retracted configuration;
   an elongate ruler element having a proximate end and a distal end, the elongate ruler element being slidably engaged adjacent the first elongate body element;
   a plurality of ruler markings on the elongate ruler element for measuring distance from the proximate end of the elongate ruler element;
   a partial-fastening element for fastening the proximate end of the elongate ruler element to the first elongate body element such that the elongate ruler element is partially fastened to the first elongate body element and can move with the first elongate body element, or independently when the second elongate body element presses against the partial-fastening element with sufficient force;
   a body fastening clip attached to the top end of the first elongate body element, the body fastening clip being adapted to engage the body of the vehicle; and
   a hub engagement post attached to the lower end of the second elongate body element, the hub engagement post being adapted to engage the hub of the vehicle.

2. The measuring device of claim 1, wherein the elongate ruler element is slidably engaged in a channel of the first elongate body element.

3. The measuring device of claim 2, wherein the second elongate body element is a tubular construction having an interior, and the first elongate body element and the elongate ruler element fit telescopically into the interior.

4. The measuring device of claim 3, wherein the partial-fastening element includes a pair of clamp elements fastened together with screws to fit around both the first elongate body element and the elongate ruler element, one of the pair of clamp elements being fixedly attached to the proximal end of the elongate ruler element.

5. The measuring device of claim 4, wherein the plurality of ruler markings measure distance from the partial-fastening element.

6. The measuring device of claim 1, wherein the body fastening clip includes a clamping arm that functions to clamp the body against the first elongate body element upon the tightening of a locking screw that extends through both the first elongate body element and the clamping arm.

7. A method for measuring suspension sag of a vehicle, the method comprising the steps of:
   providing a vehicle having a body and a wheel;
   providing a measuring device comprising:
      a first elongate body element having a top end and a bottom end;
      a second elongate body element having an upper end and a lower end, the second elongate body element being slidably engaged with the first elongate body element;
      an elongate ruler element having a proximate end and a distal end, the elongate ruler element being slidably engaged adjacent the first elongate body element; and
      a plurality of ruler markings on the elongate ruler element;
   fastening the top end of the first elongate body element to the body of the vehicle;
   fastening the lower end of the second elongate body element to the wheel;
   seating a rider on the vehicle such that the first and second elongate body elements move towards a retracted configuration, and such that the elongate ruler element moves a distance relative to the first elongate body element;

removing the weight of the rider and the vehicle from the wheel, such that the first and second elongate body elements move back towards an extended configuration, and thereby moving the elongate ruler element the distance relative to the second elongate body element; and measuring the distance that the elongate ruler element has moved relative to the second elongate body element using the plurality of ruler markings.

8. A method for measuring suspension sag of a vehicle, the method comprising the steps of:

providing a vehicle having a body and a wheel with a hub;

providing a measuring device comprising:

a first elongate body element having a top end and a bottom end;

a second elongate body element having an upper end and a lower end, the second elongate body element being slidably engaged with the first elongate body element so that the first and second elongate body elements slide with respect to each other between an extended configuration and a retracted configuration;

an elongate ruler element having a proximate end and a distal end, the elongate ruler element being slidably engaged adjacent the first elongate body element;

a plurality of ruler markings on the elongate ruler element for measuring distance from the proximate end of the elongate ruler element; and a partial-fastening element for fastening the proximate end of the elongate ruler element to the first elongate body element;

fastening the top end of the first elongate body element to the body of the vehicle;

extending the first and second elongate body elements towards the extended configuration;

fastening the lower end of the second elongate body element to the hub of the vehicle;

sliding the elongate ruler element towards the second elongate body element until the partial-fastening element abuts an upper edge of the second elongate body element;

seating a rider on the vehicle, causing the body to sag towards the hub and to compress the first and second elongate body elements towards the retracted configuration, and thereby causing the upper edge of the second elongate body element to move the elongate ruler element a distance relative to the first elongate body element; and removing the rider from the vehicle, causing the body to lift back to its original position, thereby pulling the first and second elongate body elements back towards the extended configuration, with the partial-fastening element pulling the elongate ruler element along with the first elongate body element such that the elongate ruler element moves the distance with respect to the upper edge of the second elongate body element, and such that the plurality of ruler markings adjacent the upper edge indicate the distance moved.

* * * * *